US011148656B2

(12) United States Patent
Tsuchida et al.

(10) Patent No.: US 11,148,656 B2
(45) Date of Patent: Oct. 19, 2021

(54) HYBRID VEHICLE

(71) Applicant: TOYOTA JIDOSHA KABUSHIKI KAISHA, Toyota (JP)

(72) Inventors: Yasutaka Tsuchida, Toyota (JP); Takahiro Kimura, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 16/423,588

(22) Filed: May 28, 2019

(65) Prior Publication Data

US 2019/0367005 A1    Dec. 5, 2019

(30) Foreign Application Priority Data

May 29, 2018    (JP) .............................. JP2018-102816

(51) Int. Cl.
    *B60W 20/00*    (2016.01)
    *B60W 10/06*    (2006.01)
    (Continued)

(52) U.S. Cl.
    CPC ............. *B60W 20/00* (2013.01); *B60K 6/543* (2013.01); *B60K 6/547* (2013.01); *B60K 17/16* (2013.01); *B60W 10/06* (2013.01); *B60W 10/08* (2013.01); *B60W 10/105* (2013.01); *B60W 10/11* (2013.01); *B60K 6/365* (2013.01);
    (Continued)

(58) Field of Classification Search
    CPC ...... B60W 20/00; B60W 10/06; B60W 10/08; B60W 10/105; B60W 10/11; B60W 10/115; B60W 2510/06; B60W 2510/0676; B60W 2510/10; B60W 2520/10; B60W 2710/0644; B60W 2710/08; B60W 2710/10; B60K 6/365; B60K 6/46; B60K 6/48; F16H 2200/0021; F16H 2200/0043;
    (Continued)

(56) References Cited

U.S. PATENT DOCUMENTS

2016/0167666 A1*  6/2016  Oohata ................... F16D 48/06
                                            477/166
2018/0086205 A1*  3/2018  Koyama ................ B60K 28/16

FOREIGN PATENT DOCUMENTS

EP         2 801 501 A1    11/2014
JP         2001-164960     6/2001
    (Continued)

*Primary Examiner* — Tisha D Lewis
(74) *Attorney, Agent, or Firm* — Oblon, McClelland, Maier & Neustadt, L.L.P.

(57) ABSTRACT

In a hybrid vehicle, when the engine is started and caused to make a transition from a stopped state into an operating state, the control device performs an operation control of the rotary machine and an output control of the engine to increase the rotation speed of the engine so that the rotation speed reaches a target rotation speed after the transition of the engine into the operating state, determined by the shifting control, and during increasing the rotation speed, when suppression conditions further including a condition that a vehicle speed is equal to or lower than a predetermined vehicle speed, and a condition that an output request amount by a driver is smaller than a predetermined output request amount, are satisfied, the control device suppresses an increase rate of the rotation speed until a predetermined time elapses from an initiation of starting of the engine as compared with when the suppression conditions are not satisfied.

7 Claims, 5 Drawing Sheets

(51) Int. Cl.
  *B60W 10/08* (2006.01)
  *B60K 6/543* (2007.10)
  *B60K 6/547* (2007.10)
  *B60K 17/16* (2006.01)
  *B60W 10/105* (2012.01)
  *B60W 10/11* (2012.01)
  *B60K 6/365* (2007.10)
  *B60K 6/46* (2007.10)
  *B60K 6/48* (2007.10)
  *B60W 10/115* (2012.01)
  *F16H 3/72* (2006.01)

(52) U.S. Cl.
  CPC .................. *B60K 6/46* (2013.01); *B60K 6/48* (2013.01); *B60W 10/115* (2013.01); *B60W 2510/06* (2013.01); *B60W 2510/0676* (2013.01); *B60W 2510/10* (2013.01); *B60W 2520/10* (2013.01); *B60W 2710/0644* (2013.01); *B60W 2710/08* (2013.01); *B60W 2710/10* (2013.01); *B60Y 2200/92* (2013.01); *F16H 3/727* (2013.01); *F16H 2200/0021* (2013.01); *F16H 2200/0043* (2013.01); *F16H 2200/201* (2013.01); *F16H 2200/2041* (2013.01); *F16H 2200/2066* (2013.01); *F16H 2200/2082* (2013.01); *Y10S 903/903* (2013.01)

(58) Field of Classification Search
  CPC ....... F16H 2200/201; F16H 2200/2041; F16H 2200/2082; F16H 3/727
  See application file for complete search history.

(56) References Cited

FOREIGN PATENT DOCUMENTS

| | | | |
|---|---|---|---|
| JP | 2004052584 A | * 2/2004 | ............ F02D 29/06 |
| JP | 2006-321392 | 11/2006 | |

\* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| SIMULATED GEAR POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

HYBRID VEHICLE

This application claims priority from Japanese Patent Application No. 2018-102816 filed on May 29, 2018, the disclosure of which is herein incorporated by reference in its entirety.

FIELD OF THE ART

The present invention relates to a hybrid vehicle including an engine and a rotary machine configured to control a rotation speed of the engine.

BACKGROUND ART

A hybrid vehicle including an engine, a rotary machine configured to control a rotation speed of the engine, and a control device configured to perform a shifting control to change a rotation speed of the engine as in stepped shifting, is well-known. Such a hybrid vehicle is, for example, a hybrid vehicle described in Patent Document 1. This Patent Document 1 discloses that, in a transmission that can perform stepless shifting, a shifting control to change an engine rotation speed as in stepped shifting is performed.

PRIOR ART DOCUMENT

Patent Document

[PATENT DOCUMENT 1] Japan Patent Publication No. 2006-321392

SUMMARY OF THE INVENTION

Technical Problem

For example, in a hybrid vehicle capable of intermittently operating an engine, a demand for quietness is considered to be high, so that engine noise easily becomes a problem at the time of engine starting in a vehicle state in a period from vehicle stoppage to about a medium vehicle speed. In particular, in a case of a vehicle that changes an engine rotation speed as in stepped shifting, if a target engine rotation speed corresponding to a gear position at that time is set to be high, a sudden increase in engine rotation speed occurs at the time of engine starting and engine noise easily increases, so that the engine noise may become a problem in a vehicle state in a period from vehicle stoppage to about a medium vehicle speed.

The present invention was made in view of the above-described circumstances, and an object thereof is to provide a hybrid vehicle capable of suppressing engine noise while suppressing an influence on responsiveness of drive force when increasing an engine rotation speed as in stepped shifting at the time of engine starting.

Solution to Problem

To achieve the above object, a first aspect of the present invention provides a hybrid vehicle comprising (a) an engine, a rotary machine configured to control a rotation speed of the engine, and a control device configured to perform a shifting control to change the rotation speed of the engine as in stepped shifting, wherein (b) when the engine is started and caused to make a transition from a stopped state into an operating state, the control device performs an operation control of the rotary machine and an output control of the engine to increase the rotation speed of the engine so that the rotation speed of the engine reaches a target engine rotation speed after the transition of the engine into the operating state, determined by the shifting control, and during increasing the rotation speed of the engine, when suppression conditions further including a condition that a vehicle speed is equal to or lower than a predetermined vehicle speed, and a condition that an output request amount by a driver is smaller than a predetermined output request amount, are satisfied, the control device suppresses an increase rate of the rotation speed of the engine until a predetermined time elapses from an initiation of starting of the engine as compared with when the suppression conditions are not satisfied.

A second aspect of the present invention provides the hybrid vehicle recited in the first aspect of the invention, wherein the suppression conditions further include a condition that the starting of the engine is not a first starting after the control device is turned on.

A third aspect of the present invention provides the hybrid vehicle recited in the first or second aspect of the invention, wherein the suppression conditions further include a condition that the starting of the engine is not requested during a transition of the engine from an operating state into a stopped state.

A fourth aspect of the present invention provides the hybrid vehicle recited in any one of the first to third aspects of the invention, wherein the suppression conditions further include a condition that a temperature of a coolant of the engine is higher than a predetermined coolant temperature.

A fifth aspect of the present invention provides the hybrid vehicle recited in any one of the first to fourth aspects of the invention, further comprising: a stepped automatic transmission which constitutes a part of a power transmission path between the engine and a drive wheel, and in which each of a plurality of gear positions is formed by engagement of a respective set of a plurality of engagement devices, wherein the suppression conditions further include a condition that downshifting of the automatic transmission is not being executed.

A sixth aspect of the present invention provides the hybrid vehicle recited in any one of the first to fourth aspects of the invention, further comprising: a differential mechanism that distributes power of the engine to the rotary machine and a transmission member to transmit power to a drive wheel, and a second rotary machine coupled to the transmission member, wherein in a case where the suppression conditions are satisfied, the control device suppresses the increase rate of the rotation speed of the engine by suppressing an output of the engine, as compared to a case where the suppression conditions are not satisfied, and makes up for a suppressed amount of the output of the engine by an output of the second rotary machine in order to obtain a necessary drive force.

A seventh aspect of the present invention provides the hybrid vehicle recited in the sixth aspect of the invention further comprising: a stepped automatic transmission which constitutes a part of a power transmission path between the transmission member and the drive wheel, and in which each of a plurality of gear positions is formed by engagement of a respective set of a plurality of engagement devices, wherein the suppression conditions further include a condition that downshifting of the automatic transmission is not being executed.

Advantageous Effects of Invention

According to the first aspect of the present invention, when the engine is started and makes a transition from a stopped state into an operating state, and an engine rotation speed is increased so as to reach a target engine rotation speed after making a transition into an engine operating state, determined by a shifting control for changing the engine rotation speed as in stepped shifting, when the suppression conditions further including the condition that a vehicle speed is equal to or lower than a predetermined vehicle speed and the condition that the output request amount by the driver is smaller than a predetermined output request amount, are satisfied, an increase rate of the engine rotation speed is suppressed until a predetermined time elapses from the initiation of engine starting, as compared with when the suppression conditions are not satisfied, so that engine noise is suppressed at the time of engine starting in a vehicle state in a period from vehicle stoppage to about a medium vehicle speed in which engine noise easily becomes a problem. At this time, the engine rotation speed increase rate is suppressed when the output request amount by the driver is smaller than the predetermined output request amount, so that the driver hardly senses a lack of acceleration, and therefore, even if output of the engine is suppressed and responsiveness of drive force decreases, the decreased responsiveness is unlikely to become a problem. From a different viewpoint, the engine rotation speed increase rate is not suppressed when the output request amount by the driver is equal to or more than the predetermined output request amount, so that when a driver has an intention of acceleration, responsiveness of drive force is likely to decrease. Therefore, when increasing the engine rotation speed as in stepped shifting at the time of engine starting, engine noise can be suppressed while an influence on responsiveness of drive force is suppressed.

According to the second aspect of the present invention, in response to the phenomenon in which, when the increase rate of the engine rotation speed at the time of starting is suppressed, an air-fuel ratio deviates from stoichiometric and changes to the rich side and may influence emission (exhaust from engine), the increase rate of the engine rotation speed is suppressed at times when there is a high possibility that a catalyst to purify exhaust from the engine in a warmed-up state, other than the time of first engine starting, so that an influence on the emission is suppressed.

According to the third aspect of the present invention, in response to the phenomenon in which engine starting requested during a transition from an operating state into a stopped state of the engine is when an engine output is urgently required, and acceleration easily delays if the increase rate of the engine rotation speed is suppressed, the engine rotation speed increase rate is suppressed at times other than the time of starting of the engine, so that an influence on responsiveness of drive force is suppressed.

According to the fourth aspect of the present invention, in response to the phenomenon in which, because a fuel injection amount is increased when the engine is cold, that is, when a coolant of the engine is low in temperature, an air-fuel ratio easily changes to the rich side if the increase rate of the rotation speed of the engine at the time of starting is suppressed, the engine rotation speed increase rate is suppressed when the engine coolant temperature is higher than the predetermined coolant temperature, so that an influence on the emission is suppressed.

According to the fifth aspect of the present invention, in response to the phenomenon in which, in a shifting control of a stepped automatic transmission, when downshifting is advanced at an engagement timing of an engagement device according to a change in input torque or input rotation speed into the automatic transmission, if the increase rate of the engine rotation speed is suppressed, it becomes difficult to obtain a right engagement timing of the engagement device and a shock may occur, the engine rotation speed increase rate is suppressed except during the downshifting of the automatic transmission, so that an influence on the responsiveness of the drive force when the engagement timing of the engagement device does not match is suppressed, and a shock due to the timing of the engagement device not being matched is suppressed.

According to the sixth aspect of the present invention, in a hybrid vehicle including a differential mechanism, at the time of engine starting, engine noise can be suppressed while an influence on responsiveness of drive force is suppressed. When the engine rotation speed increase rate is suppressed by suppressing the engine output, a suppressed amount of the engine output is made up for by the output of the second rotary machine in order to obtain a necessary drive force, so that in a vehicle state where engine noise easily becomes a problem, engine noise can be suppressed while a necessary drive force is obtained.

According to the seventh aspect of the present invention, in a hybrid vehicle including a differential mechanism and a stepped automatic transmission disposed in series, an increase rate of an engine rotation speed is suppressed except during downshifting of the automatic transmission, so that an influence on the responsiveness of the drive force when the engagement timing of the engagement device does not match is suppressed, and a shock due to the timing of the engagement device not being matched is suppressed.

DESCRIPTION OF THE EMBODIMENT

In an embodiment of the present invention, a transmission gear ratio in a transmission such as the automatic transmission or a composite transmission combining the differential mechanism and the automatic transmission disposed in series, is "rotation speed of input side rotating member/ rotation speed of output side rotating member". A relatively small transmission gear ratio corresponds to a high vehicle-speed side of this transmission gear ratio. A relatively large transmission gear ratio corresponds to a low vehicle-speed side of the transmission gear ratio. For example, the lowest-side transmission gear ratio is a transmission gear ratio at the lowest vehicle-speed side where the vehicle speed is lowest, and is a maximum transmission gear ratio at which the transmission gear ratio is largest.

Hereinafter, examples of the present invention are described in detail with reference to the drawings.

EXAMPLE

Figure 1:
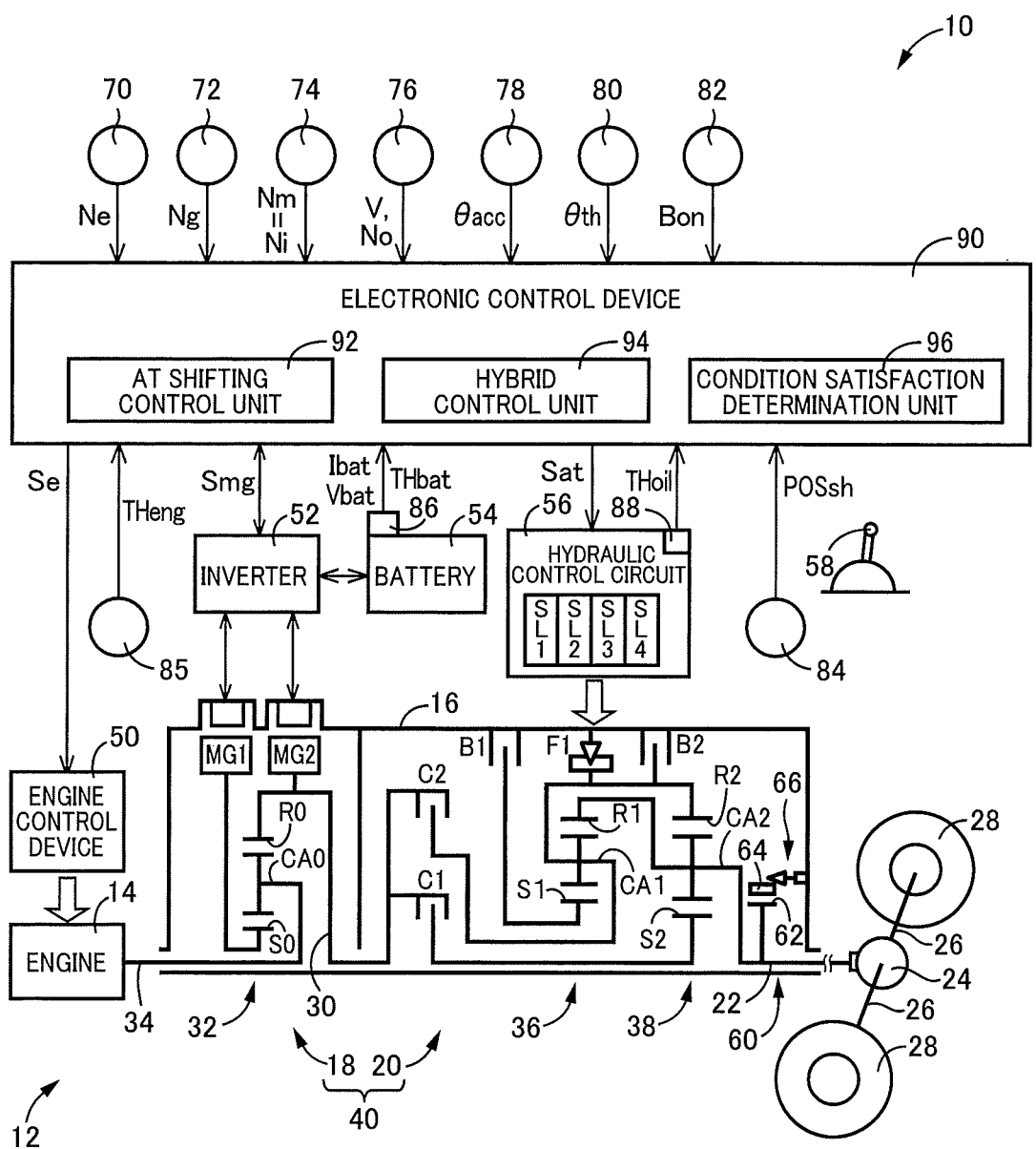
FIG. 1 is a diagram describing a schematic configuration of a vehicle drive device installed in a hybrid vehicle to which the present invention is applied, and describes an essential portion of a control function and a control system for various controls in the hybrid vehicle.

FIG. 1 is a diagram describing a schematic configuration of a vehicle drive device 12 installed in a hybrid vehicle 10 to which the present invention is applied, and describes an essential portion of a control system for various controls in the hybrid vehicle 10. In FIG. 1, the vehicle drive device 12 includes an engine 14 functioning as a power source, an electric continuously variable transmission unit 18, and a mechanical stepped transmission unit 20, etc., disposed in series on a common axis inside a transmission case 16 as a non-rotatable member attached to a vehicle body. The electric continuously variable transmission unit 18 is directly or indirectly coupled to the engine 14 via a damper (not shown), etc. The mechanical stepped transmission unit 20 is coupled to an output side of the electric continuously variable transmission unit 18. Further, the vehicle drive device 12 includes a differential gear device 24 coupled to an output shaft 22 being an output rotating member of the mechanical stepped transmission unit 20, a pair of axles 26 coupled to the differential gear device 24, etc. In the vehicle drive device 12, powers output from the engine 14 and a second rotary machine MG2 described later are transmitted to the mechanical stepped transmission unit 20, and transmitted from the mechanical stepped transmission unit 20 to drive wheels 28 of the hybrid vehicle 10 via the differential gear device 24, etc. The vehicle drive device 12 is preferably used for, for example, an FR type hybrid vehicle 10. Hereinafter, the hybrid vehicle 10 is referred to as a vehicle 10, the transmission case 16 is referred to as a case 16, the electric continuously variable transmission unit 18 is referred to as a continuously variable transmission unit 18, and the mechanical stepped transmission unit 20 is referred to as a stepped transmission unit 20. Power is synonymous with a torque and a force when not particularly distinguished. The continuously variable transmission unit 18 and the stepped transmission unit 20, etc., are configured substantially symmetrically about the common axis, and in FIG. 1, a lower half below the axis is not shown. The common axis is a crankshaft of the engine 14, an axis of a coupling shaft 34, or the like.

The engine 14 is a power source for running of the vehicle 10, and is a publicly-known internal combustion engine such as a gasoline engine or a diesel engine. In this engine 14, an engine torque Te being an output torque of the engine 14 is controlled according to control of an engine control device 50 including a throttle actuator, a fuel injection device, and an ignition device, etc., installed in the vehicle 10 by an electronic control device 90 described later. In the present example, the engine 14 is coupled to the continuously variable transmission unit 18 without a fluid type transmission device such as a torque converter and a fluid coupling.

An exhaust gas (=exhaust air) from the engine 14 passes through an exhaust pipe of the engine 14 and flows into a catalyst that the vehicle 10 has, and is purified by the catalyst and discharged into the atmosphere. The catalyst is provided in the exhaust pipe of the engine 14, and contains, for example, a well-known three-way catalyst that purifies hydrocarbon (HC), carbon monoxide (CO), and nitrogen oxide (NOx), etc., contained in the exhaust air.

The continuously variable transmission unit 18 includes a first rotary machine MG1, a differential mechanism 32 as a power dividing mechanism to mechanically distribute power of the engine 14 to the first rotary machine MG1 and an intermediate transmission member 30 being an output rotating member of the continuously variable transmission unit 18, and a second rotary machine MG2 coupled to the intermediate transmission member 30 in a power transmittable manner. The continuously variable transmission unit 18 is an electric continuously variable transmission in which a differential state of the differential mechanism 32 is controlled according to a control of operating conditions of the first rotary machine MG1. The first rotary machine MG1 is a rotary machine capable of controlling an engine rotation speed Ne being a rotation speed of the engine 14, and corresponds to a differential rotary machine, and the second rotary machine MG2 is a rotary machine that functions as a power source, and corresponds to a running drive rotary machine. Controlling an operating state of the first rotary machine MG1 is performing an operation control of the first rotary machine MG1.

The first rotary machine MG1 and the second rotary machine MG2 are rotary electric machines having a function as an electric motor (motor) and a function as a power generator (generator), and are so-called motor generators. The first rotary machine MG1 and the second rotary machine MG2 are respectively connected to a battery 54 as an electric storage device installed in the vehicle 10 via an inverter 52 installed in the vehicle 10, and according to a control of the inverter 52 by the electronic control device 90 described later, an MG1 torque Tg and an MG2 torque Tm being output torques of the respective first rotary machine MG1 and second rotary machine MG2 are controlled. Concerning the output torques of the rotary machines, a positive torque being an acceleration side is a power running torque, and a negative torque being a deceleration side is a regenerative torque. The battery 54 is an electric storage device that provides and receives electric power to and from each of the first rotary machine MG1 and the second rotary machine MG2.

The differential mechanism 32 consists of a single pinion type planetary gear drive, and includes a sun gear S0, a carrier CA0, and a ring gear R0. To the carrier CA0, the engine 14 is coupled in a power transmittable manner via the coupling shaft 34, and to the sun gear S0, the first rotary machine MG1 is coupled in a power transmittable manner, and to the ring gear R0, the second rotary machine MG2 is coupled in a power transmittable manner. In the differential mechanism 32, the carrier CA0 functions as an input element, the sun gear S0 functions as a reaction force element, and the ring gear R0 functions as an output element.

The stepped transmission unit 20 is a mechanical shifting mechanism as a stepped transmission constituting a part of a power transmission path between the intermediate transmission member 30 and the drive wheels 28, that is, a mechanical shifting mechanism constituting a part of the power transmission path between the continuously variable transmission unit 18 and the drive wheels 28. To the intermediate transmission member 30, the second rotary machine MG2 is coupled so as to rotate integrally, or to the input side of the continuously variable transmission unit 18, the engine 14 is coupled, so that the stepped transmission unit 20 is a transmission constituting a part of the power transmission path between the power source (the second rotary machine MG2 or the engine 14) and the drive wheels 28. The intermediate transmission member 30 is a transmission member to transmit power of the drive source to the drive wheels 28. The stepped transmission unit 20 is, for example, a publicly-known planetary gear type automatic transmission that includes a plurality of pairs of planetary gear drives each consisting of a first planetary gear drive 36 and a second planetary gear drive 38, and a plurality of engagement devices of a one-way clutch F1, a clutch C1, a clutch C2, a brake B1, and a brake B2. Hereinafter, the clutch C1, the clutch C2, the brake B1, and the brake B2 are simply referred to as engagement devices CB, unless they are not particularly distinguished.

The engagement devices CB are hydraulic frictional engagement devices consisting of a multi-plate or single-plate type clutch and brake to be pressed by a hydraulic actuator, and a band brake to be tightened by a hydraulic actuator, etc. In the engagement devices CB, by changing engagement torques Tcb being torque capacities of the respective engagement devices according to respective engagement hydraulic pressures PRcb being regulated engagement pressures of the engagement devices CB to be respectively output from solenoid valves SL1 to SL4, etc., inside a hydraulic control circuit 56 provided in the vehicle 10, operating states of the engagement devices CB being engaged and released states are respectively switched. Between the intermediate transmission member 30 and the output shaft 22, to transmit, for example, an AT input torque Ti being an input torque to be input into the stepped transmission unit 20 without slipping the engagement devices CB, engagement torques Tcb are needed by which assigned torques assigned to the engagement devices CB, being transmission torques that the respective engagement devices CB must take charge of with respect to the AT input torque Ti, are obtained. However, concerning the engagement torques Tcb by which transmission torques are obtained, even when the engagement torques Tcb are increased, the transmission torques do not increase. That is, the engagement torques Tcb correspond to maximum torques that the engagement devices CB can transmit, and the transmission torques correspond to torques that the engagement devices CB transmit in actuality. Preventing the engagement devices CB from slipping is equivalent to preventing a rotation speed difference among the engagement devices CB. The engagement torques Tcb (or transmission torques) and the engagement hydraulic pressures PRcb bear a substantially proportional relationship except for a region in which, for example, an engagement hydraulic pressure PRcb necessary for packing of the engagement devices CB is supplied.

In the stepped transmission unit 20, respective rotational elements of the first planetary gear drive 36 and the second planetary gear drive 38 are partially coupled to each other directly or indirectly via the engagement devices CB and the one-way clutch F1, and coupled to the intermediate transmission member 30, the case 16, or the output shaft 22. The respective rotational elements of the first planetary gear drive 36 are a sun gear S1, a carrier CA1, and a ring gear R1, and the respective rotational elements of the second planetary gear drive 38 are a sun gear S2, a carrier CA2, and a ring gear R2.

The stepped transmission unit 20 is a stepped automatic transmission in which any gear position among a plurality of shifting positions (referred to as gear positions as well) having different transmission gear ratios (referred to as gear ratios as well) γat (=AT input rotation speed Ni/output rotation speed No) is formed according to engagement of, for example, predetermined engagement devices being any of the plurality of engagement devices. That is, the stepped transmission unit 20 is a stepped automatic transmission in which a gear position is switched in response to engagement of any of the plurality of engagement devices. Switching the gear position of the stepped transmission unit 20 is execution of shifting of the stepped transmission unit 20. In the present example, the gear position formed in the stepped transmission unit 20 is referred to as an AT gear position. The AT input rotation speed Ni is an input rotation speed of the stepped transmission unit 20 being a rotation speed of an input rotating member of the stepped transmission unit 20, and is equivalent in value to a rotation speed of the intermediate transmission member 30, and equivalent in value to an MG2 rotation speed Nm being a rotation speed of the second rotary machine MG2. The AT input rotation speed Ni can be represented by the MG2 rotation speed Nm. The output rotation speed No is a rotation speed of the output shaft 22 being an output rotation speed of the stepped transmission unit 20, and is also an output rotation speed of a composite transmission being an overall transmission combining the continuously variable transmission unit 18 and the stepped transmission unit 20. The composite transmission 40 is a transmission constituting a part of the power transmission path between the engine 14 and the drive wheels 28.

Figures 2, 3:
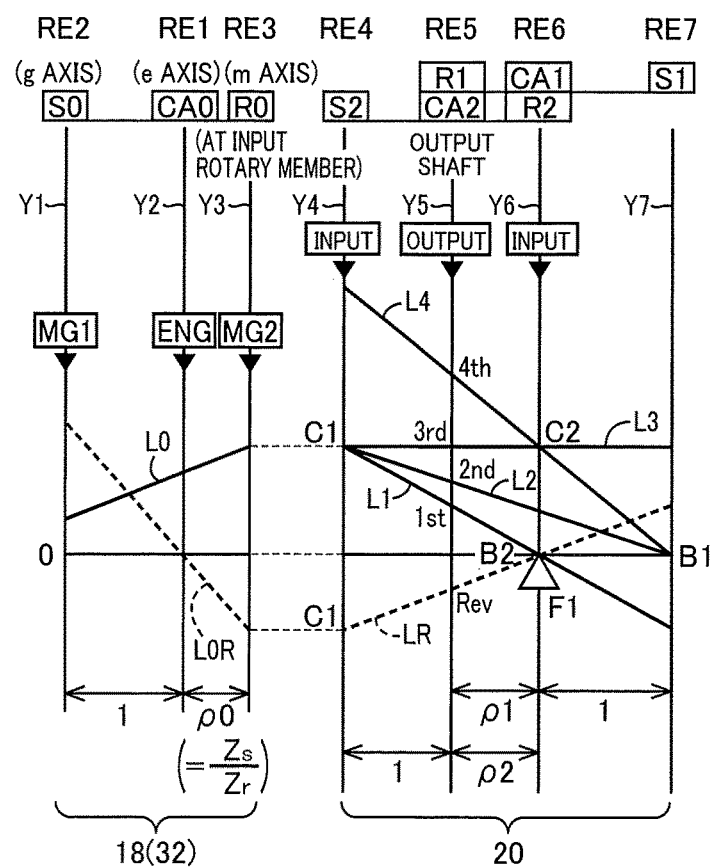
FIG. 2 is an operation chart describing a relationship between a shifting operation of a mechanical stepped transmission unit exemplified in FIG. 1 and combinations of operations of engagement devices to be used for the shifting operation.
FIG. 3 is an alignment chart showing a relative relationship among rotation speeds of respective rotational elements in an electric continuously variable transmission unit and the mechanical stepped transmission unit.

In the stepped transmission unit 20, for example, as shown in the engaging operation chart in FIG. 2, as the plurality of AT gear positions, four AT gear positions for forward running, including an AT first speed gear position ("1st" in the drawing) to an AT fourth speed gear position ("4th" in the drawing) are formed. A transmission gear ratio γat of the AT first speed gear position is largest, and as the AT gear position goes to the higher side, the smaller the transmission gear ratio γat becomes. The engaging operation chart in FIG. 2 summarizes the relationships between the respective AT gear positions and the respective operating states of the plurality of engagement devices. That is, the engaging operation chart in FIG. 2 summarizes the relationships between the respective AT gear positions and predetermined engagement devices being engagement devices to be engaged for the respective AT gear positions. In FIG. 2, "O" denotes engagement, "A" denotes engagement at the time of engine braking or coast downshifting of the stepped transmission unit 20, and a blank denotes release. The one-way clutch F1 is provided in parallel to the brake B2 that establishes the AT first speed gear position, so that the brake B2 does not need to be engaged when starting running or accelerating. Coast downshifting of the stepped transmission unit 20 is downshifting judged during deceleration in response to, for example, a turned-off state of the accelerator where an accelerator opening θacc is zero or substantially zero. By releasing all of the plurality of engagement devices, the stepped transmission unit 20 is turned into a neutral state where no AT gear position is formed, that is, a neutral state where power transmission is blocked. The one-way clutch F1 is a clutch whose activated state is automatically switched, so that when all of the engagement devices CB are released, the stepped transmission unit 20 is turned into a neutral state. Judging downshifting is requesting downshifting.

In the stepped transmission unit 20, in response to a driver's (that is, a person who drives the vehicle) accelerator operation and a vehicle speed V, etc., by controlling release of a releasing-side engagement device of the predetermined engagement devices forming an AT gear position before shifting and engagement of an engaging-side engagement device of the predetermined engagement devices forming an AT gear position after shifting by the electronic control device 90 described later, an AT gear position to be formed is switched, that is, the plurality of AT gear positions are selectively formed. That is, in shifting control of the stepped transmission unit 20, so-called clutch-to-clutch shifting is executed in which, for example, shifting is executed by changing holding on any of the engagement devices CB, that is, switching between engagement and release of the engagement devices CB. For example, in downshifting from the AT second speed gear position to the AT first speed gear position, as shown in the engaging operation chart in FIG. 2, the brake B1 as a releasing-side engagement device is released, and the brake B2 as an engaging-side engagement device is engaged. At this time, a releasing transient hydraulic pressure of the brake B1 and an engaging transient hydraulic pressure of the brake B2 are regulated and controlled. The releasing-side engagement device is an engagement device relating to shifting of the stepped transmission unit 20 among the engagement devices CB, and is an engagement device to be controlled to be released in shifting transition of the stepped transmission unit 20. The engaging-side engagement device is an engagement device relating to shifting of the stepped transmission unit 20 among the engagement devices CB, and is an engagement device to be controlled to be engaged in shifting transition of the stepped transmission unit 20. 2→1 downshifting can also be executed by automatically engaging the one-way clutch F1 by releasing the brake B1 as a releasing-side engagement device relating to 2→1 downshifting. In the present example, for example, downshifting from the AT second speed gear position to the AT first speed gear position is represented as 2→1 downshifting. The same applies to other upshifting and downshifting.

FIG. 3 is an alignment chart showing a relative relationship among rotation speeds of the respective rotational elements in the continuously variable transmission unit 18 and the stepped transmission unit 20. In FIG. 3, three vertical lines Y1, Y2, and Y3 corresponding to the three rotational elements of the differential mechanism 32 constituting the continuously variable transmission unit 18 are respectively, in order from the left side, a g axis representing a rotation speed of the sun gear S0 corresponding to a second rotational element RE2, an e axis representing a rotation speed of the carrier CA0 corresponding to a first rotational element RE1, and an m axis representing a rotation speed of the ring gear R0 (that is, an input rotation speed of the stepped transmission unit 20) corresponding to a third rotational element RE3. Four vertical lines Y4, Y5, Y6, and Y7 of the stepped transmission unit 20 are respectively, in order from the left side, an axis representing a rotation speed of the sun gear S2 corresponding to a fourth rotational element RE4, an axis representing a rotation speed of the ring gear R1 and the carrier CA2 coupled to each other (that is, a rotation speed of the output shaft 22) corresponding to a fifth rotational element RE5, an axis representing a rotation speed of the carrier CA1 and the ring gear R2 coupled to each other corresponding to a sixth rotational element RE6, and an axis representing a rotation speed of the sun gear S1 corresponding to a seventh rotational element RE7. Intervals of the vertical lines Y1, Y2, and Y3 are determined according to a gear ratio $\rho 0$ of the differential mechanism 32. Intervals of the vertical lines Y4, Y5, Y6, and Y7 are determined according to respective gear ratios $\rho 1$ and $\rho 2$ of the first and second planetary gear drives 36 and 38. In the relationship among the vertical axes in the alignment chart, when an interval between the sun gear and the carrier is set to an interval corresponding to "1", an interval between the carrier and the ring gear is set to an interval corresponding to a gear ratio $\rho$ (=the number Zs of teeth of the sun gear/the number Zr of teeth of the ring gear) of the planetary gear drive.

Expressing by use of the alignment chart in FIG. 3, in the differential mechanism 32 of the continuously variable transmission unit 18, the engine 14 (refer to "ENG" in the drawing) is coupled to the first rotational element RE1, the first rotary machine MG1 (refer to "MG1" in the drawing) is coupled to the second rotational element RE2, and the second rotary machine MG2 (refer to "MG2" in the drawing) is coupled to the third rotational element RE3 that rotates integrally with the intermediate transmission member 30 so that rotation of the engine 14 is transmitted to the stepped transmission unit 20 via the intermediate transmission member 30. In the continuously variable transmission unit 18, the relationship between the rotation speed of the sun gear S0 and the rotation speed of the ring gear R0 is shown by respective straight lines L0 and L0R crossing the vertical line Y2.

In the stepped transmission unit 20, the fourth rotational element RE4 is selectively coupled to the intermediate transmission member 30 via the clutch C1, the fifth rotational element RE5 is coupled to the output shaft 22, the sixth rotational element RE6 is selectively coupled to the intermediate transmission member 30 via the clutch C2 and selectively coupled to the case 16 via the brake B2, and the seventh rotational element RE7 is selectively coupled to the case 16 via the brake B1. In the stepped transmission unit 20, by respective straight lines L1, L2, L3, L4, and LR crossing the vertical line Y5 according to engagement/release controls of the engagement devices CB, the respective rotation speeds of "1st," "2nd," "3rd," "4th," and "Rev" at the output shaft 22 are shown.

The straight line L0 and the straight lines L1, L2, L3, and L4 being solid lines in FIG. 3 represent relative speeds of the respective rotational elements in forward running in a hybrid running mode enabling hybrid running using at least the engine 14 as a power source. In this hybrid running mode, in the differential mechanism 32, with respect to the engine torque Te to be input to the carrier CA0, when a reaction torque being a negative torque caused by the first rotary machine MG1 is input into the sun gear S0 in forward rotation, an engine direct torque Td ($=Te/(1+\rho 0)=-(1/\rho 0)\times Tg$) that becomes a positive torque in forward rotation appears in the ring gear R0. Then, in response to a requested drive force, a combined torque of the engine direct torque Td and the MG2 torque Tm is transmitted as a drive torque in a forward running direction of the vehicle 10 to the drive wheels 28 via the stepped transmission unit 20 in which any AT gear position among the AT first speed gear position to the AT fourth speed gear position is formed. At this time, the first rotary machine MG1 functions as a power generator to generate a negative torque in forward rotation. A generated electric power Wg of the first rotary machine MG1 is charged in the battery 54 or consumed by the second rotary machine MG2. The second rotary machine MG2 outputs the MG2 torque Tm by using all or a part of the generated electric power Wg or electric power from the battery 54 in addition to the generated electric power Wg.

Although not shown in FIG. 3, in the alignment chart in a motor running mode enabling motor running in which the engine 14 is stopped and the second rotary machine MG2 is used as a power source for running, in the differential mechanism 32, the carrier CA0 is set into a zero-rotation state, and the MG2 torque Tm that becomes a positive torque in forward rotation is input into the ring gear R0. At this time, the first rotary machine MG1 coupled to the sun gear S0 is set into an unloaded state and idled in negative rotation. That is, in the motor running mode, the engine 14 is not driven, and the engine rotation speed Ne is set to zero, and the MG2 torque Tm is transmitted as a drive torque in a forward running direction of the vehicle 10 to the drive wheels 28 via the stepped transmission unit 20 in which any AT gear position among the AT first speed gear position to the AT fourth speed gear position is formed. The MG2 torque Tm here is a power running torque of forward rotation.

The straight lines L0R and LR shown as dashed lines in FIG. 3 represent relative speeds of the respective rotational elements in backward running in the motor running mode. In this backward running in the motor running mode, the MG2 torque Tm that becomes a negative torque in negative rotation is input into the ring gear R0, and this MG2 torque Tm is transmitted as a drive torque in the backward running direction of the vehicle 10 to the drive wheels 28 via the stepped transmission unit 20 in which the AT first speed gear position is formed. In the vehicle 10, by the electronic control device 90 described later, in a state where, for example, the AT first speed gear position being a low-side AT gear position for forward running among the plurality of AT gear positions is formed, the MG2 torque Tm for backward running which becomes positive/negative reverse to the sign of the MG2 torque Tm for forward running at the time of forward running is output from the second rotary machine MG2, and accordingly, backward running is enabled. Here, the MG2 torque Tm for forward running is a power running torque that becomes a positive torque of forward rotation, and the MG2 torque Tm for backward running is a power running torque that becomes a negative torque of negative rotation. Thus, in the vehicle 10, the AT gear position for forward running is used, and the sign of the MG2 torque Tm is reversed to enable backward running. Using the AT gear position for forward running is using the same AT gear position as in forward running. In the hybrid running mode, it is also possible to make negative rotation of the second rotary machine MG2 as shown by the straight line L0R, so that backward running is possible as in the motor running mode.

In the vehicle drive device 12, the continuously variable transmission unit 18 as an electric shifting mechanism is configured which includes the differential mechanism 32 having three rotational elements of the carrier CA0 as the first rotational element RE1 to which the engine 14 is coupled in a power transmittable manner, the sun gear S0 as the second rotational element RE2 to which the first rotary machine MG1 is coupled in a power transmittable manner, and the ring gear R0 as the third rotational element RE3 to which the intermediate transmission member 30 is coupled, and in which a differential state of the differential mechanism 32 is controlled according to control of operating conditions of the first rotary machine MG1. The third rotational element RE3 to which the intermediate transmission member 30 is coupled is a third rotational element RE3 to which the second rotary machine MG2 is coupled in a power transmittable manner from another viewpoint. That is, in the vehicle drive device 12, the continuously variable transmission unit 18 is configured which includes the differential mechanism 32 to which the engine 14 is coupled in a power transmittable manner and the first rotary machine MG1 coupled to the differential mechanism 32 in a power transmittable manner, and in which a differential state of the differential mechanism 32 is controlled according to control of operating conditions of the first rotary machine MG1. The continuously variable transmission unit 18 is operated as an electric continuously variable transmission in which a transmission gear ratio $\gamma 0$ (=Ne/Nm) being a value of a ratio of an engine rotation speed Ne equivalent in value to a rotation speed of the coupling shaft 34 serving as an input rotating member and the MG2 rotation speed Nm being a rotation speed of the intermediate transmission member 30 serving as an output rotating member is changed.

For example, in the hybrid running mode, when a rotation speed of the sun gear S0 is increased or decreased according to control of the rotation speed of the first rotary machine MG1 with respect to a rotation speed of the ring gear R0 to be restricted by rotation of the drive wheels 28 in response to formation of an AT gear position in the stepped transmission unit 20, the rotation speed of the carrier CA0, that is, the engine rotation speed Ne is increased or decreased. Therefore, in hybrid running, the engine 14 can be operated at an operation point with high efficiency. That is, the stepped transmission unit 20 in which the AT gear position is formed and the continuously variable transmission unit 18 operated as a continuously variable transmission can constitute a continuously variable transmission as a whole of the composite transmission 40 in which the continuously variable transmission unit 18 and the stepped transmission unit 20 are disposed in series.

Alternatively, the continuously variable transmission unit 18 can also be made to perform shifting like a stepped transmission, and therefore, by the stepped transmission unit 20 in which an AT gear position is formed and the continuously variable transmission unit 18 made to perform shifting like a stepped transmission, the composite transmission 40 can be made to perform shifting like a stepped transmission as a whole. That is, in the composite transmission 40, the stepped transmission unit 20 and the continuously variable transmission unit 18 can be controlled so that the plurality of gear positions that are different in transmission gear ratio $\gamma t$ (=Ne/No) representing a ratio of the engine rotation speed Ne to the output rotation speed No are selectively established. In the present example, gear positions to be established by the composite transmission 40 are referred to as simulated gear positions. The transmission gear ratio $\gamma t$ is a total transmission gear ratio to be formed by the continuously variable transmission unit 18 and the stepped transmission unit 20 disposed in series, and is a value ($\gamma t = \gamma 0 \times \gamma at$) obtained by multiplying a transmission gear ratio $\gamma 0$ of the continuously variable transmission unit 18 by a transmission gear ratio $\gamma at$ of the stepped transmission unit 20.

Figures 4, 5:
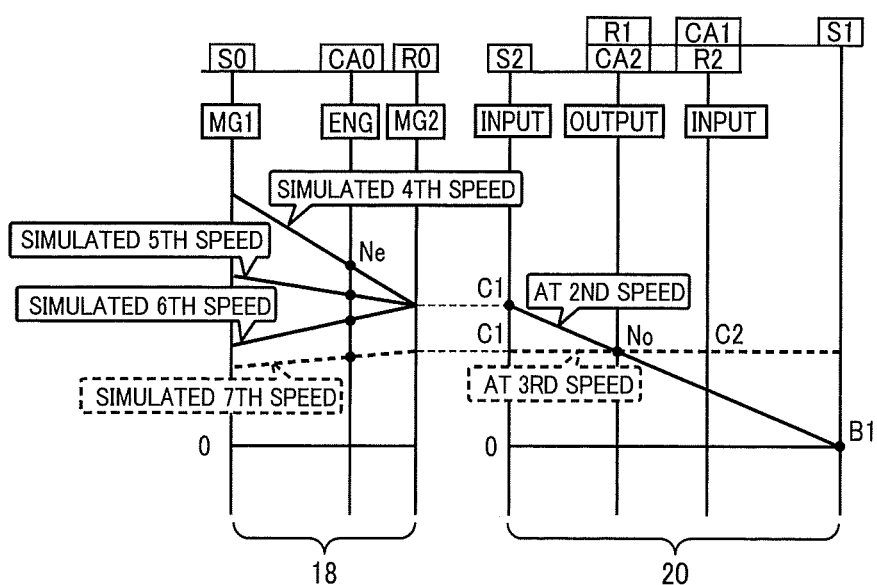
FIG. 4 is a diagram describing an example of a gear position assignment table showing assignment of a plurality of simulated gear positions to a plurality of AT gear positions.
FIG. 5 is a diagram illustrating the AT gear positions of the stepped transmission unit and the simulated gear positions of the composite transmission on the same alignment chart as in FIG. 3.

The simulated gear positions are assigned so that, for example, one or a plurality of kinds are established for each AT gear position of the stepped transmission unit 20 according to a combination of each AT gear position of the stepped transmission unit 20 and one or a plurality of kinds of transmission gear ratios $\gamma 0$ of the continuously variable transmission unit 18. For example, FIG. 4 shows an example of a gear position assignment table. In FIG. 4, simulated gear positions are determined in advance so that a simulated first speed gear position to a simulated third speed gear position are established for the AT first speed gear position, a simulated fourth speed gear position to a simulated sixth speed gear position are established for the AT second speed gear position, a simulated seventh speed gear position to a simulated ninth speed gear position are established for the AT third speed gear position, and a simulated tenth speed gear position is established for the AT fourth speed gear position.

FIG. 5 is a diagram illustrating the AT gear positions of the stepped transmission unit 20 and the simulated gear positions of the composite transmission 40 on the same alignment chart as in FIG. 3. In FIG. 5, the solid line illustrates a case where when the stepped transmission unit 20 establishes the AT second speed gear position, the simulated fourth speed gear position to the simulated sixth speed gear position are established. In the composite transmission 40, the continuously variable transmission unit 18 is controlled so that an engine rotation speed Ne that realizes a predetermined transmission gear ratio γt is reached with respect to the output rotation speed No, and accordingly, different simulated gear positions are established for a certain AT gear position. The dashed line illustrates a case where when the stepped transmission unit 20 forms the AT third speed gear position, the simulated seventh speed gear position is established. In the composite transmission 40, the continuously variable transmission unit 18 is controlled according to switching of the AT gear position, and accordingly, the simulated gear position is switched.

Returning to FIG. 1, the vehicle 10 includes a shift lever 58. The shift lever 58 is a shifting operation member to be operated by a driver to any of a plurality of operation positions POSsh. The operation positions POSsh are operation positions of the shift lever 58, and include, for example, P, R, N, and D operation positions.

The P operation position is a parking operation position for selecting a parking position (=P position) of the composite transmission 40 where the composite transmission 40 is turned into a neutral state and the output shaft 22 is mechanically prevented from rotating. A neutral state of the composite transmission 40 is realized, for example, by making the continuously variable transmission unit 18 unable to transmit an engine torque Te by idling the first rotary machine MG1 in an unloaded state and taking no reaction torque with respect to the engine torque Te, and idling the second rotary machine MG2 in an unloaded state and blocking power transmission in the composite transmission 40. The state where the output shaft 22 is prevented from rotating is a state where the output shaft 22 is fixed non-rotatably. The output shaft 22 is fixed non-rotatably by a parking lock mechanism 60 provided in the vehicle 10.

The R operation position is a backward running operation position for selecting a backward running position (=R position) of the composite transmission 40 to enable backward running of the vehicle 10 by the MG2 torque Tm for backward running in a state where an AT first speed gear position of the stepped transmission unit 20 is formed. The N operation position is a neutral operation position for selecting a neutral position (=N position) of the composite transmission 40 where the composite transmission 40 is in a neutral state. The D operation position is a forward running operation position for selecting a forward running position (=D position) of the composite transmission 40 to enable forward running by executing an automatic shifting control by using all simulated gear positions of, for example, the simulated first speed gear position to the simulated tenth speed gear position. When the operation position POSsh is at the D operation position, an automatic shifting mode in which the composite transmission 40 is automatically shifted according to, for example, a shifting map like a simulated gear position shifting map described later is established.

The parking lock mechanism 60 includes a parking lock gear 62, a parking lock pawl 64, and a switching member 66, etc. The parking lock gear 62 is a member provided so as to rotate integrally with the output shaft 22. The parking lock pawl 64 has a claw portion that meshes with gear teeth of the parking lock gear 62, and is a member capable of meshing with the parking lock gear 62. The switching member 66 includes a cam that makes the parking lock pawl 64 mesh with the parking lock gear 62 by being moved to the parking lock pawl 64 side, and a parking rod that supports the cam at one end portion, etc.

When the shift lever 58 is operated to the P operation position, via a coupling mechanism such as a link or cable provided in the vehicle 10 to mechanically couple the shift lever 58 and the other end portion of the parking rod, or by controlling an actuator provided in the vehicle 10 to move the parking rod by the electronic control device 90 described later, the switching member 66 is activated so as to bias the cam to the parking lock pawl 64 side. Accordingly, the parking lock pawl 64 is moved to the parking lock gear 62 side. When the parking lock pawl 64 is moved to a position to mesh with the parking lock gear 62, the output shaft 22 is fixed non-rotatably together with the parking lock gear 62, and the drive wheels 28 that rotate in conjunction with the output shaft 22 are fixed non-rotatably.

The vehicle 10 includes the electronic control device 90 as a controller including control devices of the vehicle 10 relating to controls of the engine 14, the continuously variable transmission unit 18, and the stepped transmission unit 20, etc. Therefore, FIG. 1 is a diagram showing an input/output system of the electronic control device 90, and a functional block diagram describing an essential portion of control functions of the electronic control device 90. The electronic control device 90 is configured to include a so-called microcomputer with, for example, a CPU, a RAM, a ROM, and an I/O interface, etc., and the CPU executes various controls of the vehicle 10 by performing signal processing according to programs stored in advance in the ROM while utilizing a temporary memory function of the RAM. The electronic control device 90 is configured so as to be divided for engine control and shifting control, etc., as necessary.

To the electronic control device 90, various signals, etc., based on detection values (for example, the engine rotation speed Ne, an MG1 rotation speed Ng being a rotation speed of the first rotary machine MG1, the MG2 rotation speed Nm being the AT input rotation speed Ni, the output rotation speed No corresponding to the vehicle speed V, the accelerator opening θacc as a driver's accelerating operation amount representing a magnitude of a driver's accelerator operation, a throttle valve opening θth being an opening of an electronic throttle valve, a brake-on Bon being a signal representing a state where a brake pedal for activating a wheel brake is being operated by a driver, the operation position POSsh, an engine coolant temperature THeng being a temperature of a coolant of the engine 14, a battery temperature THbat, a battery charging/discharging current Ibat, and a battery voltage Vbat of the battery 54, and a hydraulic oil temperature THoil being a temperature of a hydraulic oil to be supplied to a hydraulic actuator of the engagement devices CB, etc.,) detected by various sensors, etc., (for example, an engine rotation speed sensor 70, an MG1 rotation speed sensor 72, an MG2 rotation speed sensor 74, an output rotation speed sensor 76, an accelerator opening sensor 78, a throttle valve opening sensor 80, a brake switch 82, a shift position sensor 84, an engine coolant temperature sensor 85, a battery sensor 86, and an oil temperature sensor 88, etc.,) equipped in the vehicle 10, are respectively supplied.

A driver's accelerating operation amount representing a magnitude of a driver's accelerating operation is an accelerating operation amount being an operation amount of an accelerating operation member such as an accelerator pedal, and is a driver's output request amount requested for the vehicle 10. As the driver's output request amount, other than the accelerator opening θacc, the throttle valve opening θth, etc., can be used.

From the electronic control device 90, various command signals (for example, an engine control command signal Se for controlling the engine 14, rotary machine control command signals Smg for controlling the first rotary machine MG1 and the second rotary machine MG2, and hydraulic control command signals Sat for controlling operating states of the engagement devices CB, etc.,) are respectively output to the respective devices installed in the vehicle 10 (for example, the engine control device 58, the inverter 52, and the hydraulic control circuit 56, etc.). The hydraulic control command signals Sat are hydraulic control command signals for controlling shifting of the stepped transmission unit 20, and command signals for driving, for example, respective solenoid valves SL1 to SL4, etc., to regulate respective engagement hydraulic pressures PRcb to be supplied to the respective hydraulic actuators of the engagement devices CB. The electronic control device 90 sets hydraulic pressure instruction values corresponding to values of the respective engagement hydraulic pressures PRcb to be supplied to the respective hydraulic actuators to obtain target engagement torques Tcb of the engagement devices CB, and outputs drive currents or drive voltages corresponding to the hydraulic pressure instruction values to the hydraulic control circuit 56.

The electronic control device 90 calculates a state of charge value SOC [%] as a value showing a state of charge of the battery 54 based on, for example, the battery charging/discharging current Ibat and the battery voltage Vbat, etc. Also, the electronic control device 90 calculates chargeable and dischargeable electric powers Win and Wout regulating a usable range of battery power Pbat being power of the battery 54 based on, for example, the battery temperature THbat and the state of charge value SOC of the battery 54. The chargeable and dischargeable electric powers Win and Wout are chargeable electric power Win as power that can be input, regulating limitation on input power of the battery 54, and dischargeable electric power Wout as power that can be output, regulating limitation on output power of the battery 54. For example, the chargeable and dischargeable electric powers. Win and Wout are set to be smaller as the battery temperature THbat becomes lower in a low-temperature range in which the battery temperature THbat is lower than a normal range, and set to be smaller as the battery temperature THbat becomes higher in a high-temperature range in which the battery temperature THbat is higher than the normal range. For example, the chargeable electric power Win is set to be smaller as the state of charge value SOC becomes higher in a region in which the state of charge value SOC is high. For example, the dischargeable electric power Wout is set to be smaller as the state of charge value SOC becomes lower in a region in which the state of charge value SOC is low.

To realize various controls in the vehicle 10, the electronic control device 90 includes an AT shifting control means, that is, an AT shifting control unit 92, and a hybrid control means, that is, a hybrid control unit 94.

The AT shifting control unit 92 judges shifting of the stepped transmission unit 20 by using, for example, an AT gear position shifting map showing a relationship obtained experimentally or in design and stored in advance, that is, a predetermined relationship, and executes shifting control of the stepped transmission unit 20 as necessary. In this shifting control of the stepped transmission unit 20, to automatically switch the AT gear position of the stepped transmission unit 20, the AT shifting control unit 92 outputs, to the hydraulic control circuit 56, hydraulic control command signals Sat to switch engaged/released states of the engagement devices CB by the solenoid valves SL1 to SL4. The above-described AT gear position shifting map shows a predetermined relationship, having shifting lines for judgment on shifting of the stepped transmission unit 20 on, for example, a two-dimensional coordinate system using the output rotation speed No and the accelerator opening θacc as variables. Here, the vehicle speed V or the like may be used in place of the output rotation speed No, and a requested drive torque Tdem, a throttle valve opening θth, or the like may be used in place of the accelerator opening θacc. The respective shifting lines on the AT gear position shifting map are upshifting lines for judging upshifting, and downshifting lines for judging downshifting. Each shifting line is for judging, on a line showing a certain accelerator opening θacc, whether the output rotation speed No has crossed the line, or on a line showing a certain output rotation speed No, whether the accelerator opening θacc has crossed the line, that is, judging whether a shifting point being a value at which shifting should be executed on a shifting line has been crossed, and is determined in advance as a series of shifting points.

The hybrid control unit 94 includes a function as an engine control means, that is, an engine control unit to control operation of the engine 14, and a function as a rotary machine control means, that is, a rotary machine control unit to control operations of the first rotary machine MG1 and the second rotary machine MG2 via the inverter 52, and by these control functions, executes hybrid drive control, etc., using the engine 14, the first rotary machine MG1, and the second rotary machine MG2. The hybrid control unit calculates a requested drive power Pdem by applying the accelerator opening θacc and the vehicle speed V to, for example, a drive power map showing a predetermined relationship. This requested drive power Pdem is the requested drive torque Tdem at a current vehicle speed V from another viewpoint. To realize the requested drive power Pdem, the hybrid control unit 94 outputs the engine control command signal Se being a command signal to control the engine 14, and the rotary machine control command signals Smg being command signals to control the first rotary machine MG1 and the second rotary machine MG2 in consideration of the chargeable and dischargeable electric powers Win and Wout, etc., of the battery 54. The engine control command signal Se is, for example, a command value of engine power Pe being power of the engine 14 that outputs the engine torque Te at a current engine rotation speed Ne. The rotary machine control command signals Smg are, for example, a command value of generated electric power Wg of the first rotary machine MG1 that outputs the MG1 torque Tg at the MG1 rotation speed Ng at the time of command output as a reaction torque of the engine torque Te, and a command value of electric power consumption Wm of the second rotary machine MG2 that outputs the MG2 torque Tm at the MG2 rotation speed Nm at the time of command output.

For example, when the continuously variable transmission unit 18 is operated as a continuously variable transmission and the composite transmission 40 is operated as a continuously variable transmission as a whole, considering the optimum point of the fuel consumption, to obtain the engine rotation speed Ne and the engine torque Te by which engine power Pe realizing the requested drive power Pdem is obtained, the hybrid control unit 94 changes a transmission gear ratio γ0 of the continuously variable transmission unit 18 by executing continuously variable shifting control of the continuously variable transmission unit 18 by controlling the engine 14 and controlling the generated electric power Wg of the first rotary machine MG1. As a result of this control, a transmission gear ratio γt of the composite transmission 40 when operated as a continuously variable transmission is controlled.

For example, when making the continuously variable transmission unit 18 perform shifting like a stepped transmission and making the composite transmission 40 perform shifting like a stepped transmission as a whole, the hybrid control unit 94 judges shifting of the composite transmission 40 by using, for example, a simulated gear position shifting map showing a predetermined relationship, and executes shifting control of the continuously variable transmission unit 18 so as to selectively establish the plurality of simulated gear positions in coordination with shifting control of the AT gear positions of the stepped transmission unit 20 by the AT shifting control unit 92. The plurality of simulated gear positions can be established by controlling the engine rotation speed Ne by the first rotary machine MG1 according to the output rotation speed No so as to maintain the respective transmission gear ratios γt. The transmission gear ratios γt of the respective simulated gear positions do not necessarily have to be constant values throughout the entire region of the output rotation speed No, and may be changed in a predetermined region, and may be limited according to upper limits and lower limits, etc., of rotation speeds of the respective units. In this way, the hybrid control unit 94 can perform a shifting control to change the engine rotation speed Ne as in stepped shifting.

Figure 6:
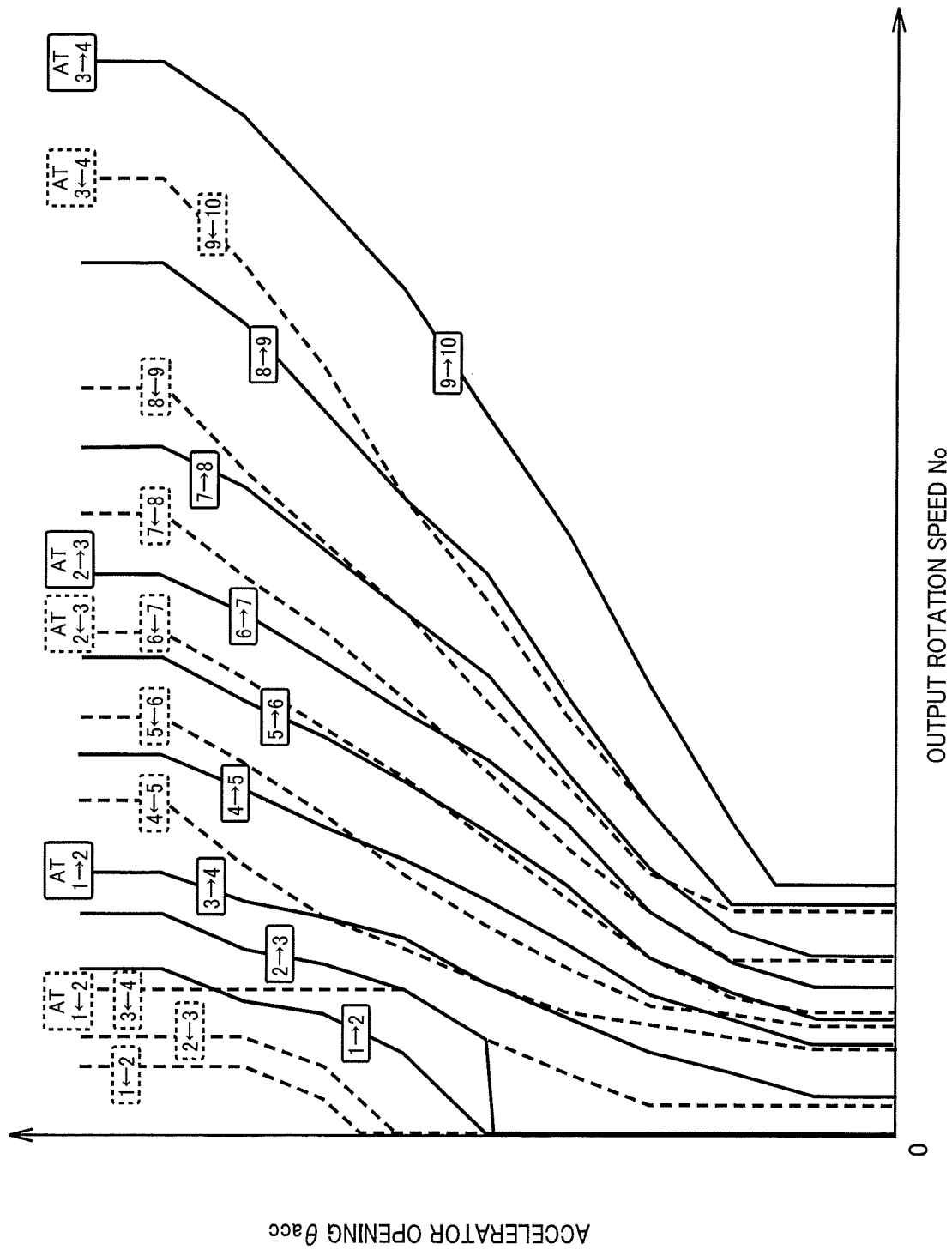
FIG. 6 is a diagram describing an example of a simulated gear position shifting map to be used for a shifting control of the plurality of simulated gear positions.

In the above-described simulated gear position shifting map, as in the AT gear position shifting map, the output rotation speed No and the accelerator opening θacc are determined in advance as parameters. FIG. 6 shows an example of the simulated gear position shifting map, and solid lines are upshifting lines, and dashed lines are downshifting lines. By switching the simulated gear position according to the simulated gear position shifting map, the same shifting feeling as that of a stepped transmission is obtained by the whole of the composite transmission 40 including the continuously variable transmission unit 18 and the stepped transmission unit 20 disposed in series. In the simulated stepped shifting control to make the composite transmission 40 perform shifting like a stepped transmission as a whole, for example, when a running mode focusing on running performance such as a sports running mode is selected by a driver or when the requested drive torque Tdem is comparatively large, the continuously variable shifting control in which the composite transmission 40 is operated as a continuously variable transmission as a whole may be just preferentially executed, however, it is also possible that simulated stepped shifting control is basically executed except for a predetermined time when execution is limited.

The simulated stepped shifting control by the hybrid control unit 94 and the shifting control of the stepped transmission unit 20 by the AT shifting control unit 92 are executed in coordination with each other. In the present example, to 4 kinds of AT gear positions of the AT first speed gear position to the AT fourth speed gear position, 10 kinds of simulated gear positions of the simulated first speed gear position to the simulated tenth speed gear position are assigned. Therefore, the AT gear position shifting map is determined so that shifting of the AT gear position is performed at the same timing as a timing of shifting of the simulated gear position. In detail, the respective "3→4", "6→7", and "9→10" upshifting lines of the simulated gear positions in FIG. 6 match the respective "1→2", "2→3", and "3→4" upshifting lines in the AT gear position shifting map (refer to "AT1→2" etc., in FIG. 6). The respective "3←4", "6←7", and "9←10" downshifting lines of the simulated gear positions in FIG. 6 match the respective "1←2", "2←3", and "3←4" downshifting lines in the AT gear position shifting map (refer to "AT1←2" etc., in FIG. 6). Alternatively, an AT gear position shifting command may be output to the AT shifting control unit 92 based on judgment on shifting of the simulated gear position according to the simulated gear position shifting map in FIG. 6. In this way, at the time of upshifting of the stepped transmission unit 20, upshifting of the whole composite transmission 40 is performed, and on the other hand, at the time of downshifting of the stepped transmission unit 20, downshifting of the whole composite transmission 40 is performed. The AT shifting control unit 92 switches the AT gear position of the stepped transmission unit 20 when the simulated gear position is switched. Because shifting of the AT gear position is performed at the same timing as a timing of shifting of the simulated gear position, shifting of the stepped transmission unit 20 is performed by being accompanied by a change in engine rotation speed Ne, and even when a shock in response to shifting of the stepped transmission unit 20 occurs, it hardly provides a sense of discomfort to a driver.

The hybrid control unit 94 selectively establishes, as a running mode, the motor running mode or the hybrid running mode according to a running state. For example, when the requested drive power Pdem is in a motor running region smaller than a predetermined threshold, the hybrid control unit 94 establishes the motor running mode, and on the other hand, when the requested drive power Pdem is in a hybrid running region equal to or higher than the predetermined threshold, the hybrid control unit 84 establishes the hybrid running mode. Even when the requested drive power Pdem is in the motor running region, if the state of charge value SOC of the battery 54 is less than a predetermined engine starting threshold, the hybrid control unit 94 establishes the hybrid running mode. The motor running mode is a running state where running is performed by generating a drive torque by the second rotary machine MG2 while the engine 14 is stopped. The hybrid running mode is a running state where running is performed while the engine 14 is operated. The engine starting threshold is a threshold determined in advance for judging a state of charge value SOC showing that the battery 54 needs to be charged by forcibly starting the engine 14.

Here, a control to cause the engine 14 in a stopped state where the engine 14 is stopped to make a transition into an operating state where the engine 14 is operated by starting the engine 14 is described in detail. The hybrid control unit 94 establishes the hybrid running mode and starts the engine 14 when the vehicle state transits from the motor running region into the hybrid running region or when the state of charge value SOC becomes lower than the engine starting threshold during stoppage of operation of the engine 14. When starting the engine 14, by igniting when the engine rotation speed Ne reaches a predetermined rotation speed or more enabling ignition while increasing the engine rotation speed Ne by the first rotary machine MG1, the hybrid control unit 94 starts the engine 14. That is, the hybrid control unit 94 starts the engine 14 by cranking the engine 14 by the first rotary machine MG1. After the engine 14 completely explodes and becomes able to perform self-sustained operation, the hybrid control unit 94 performs an output control of the engine 14 to output a command value of engine power Pe so as to increase the engine rotation speed Ne to a target engine rotation speed Netgt being a target value of the engine rotation speed Ne, and performs an operation control of the first rotary machine MG1 to control the engine rotation speed Ne by the first rotary machine MG1 so as to obtain the target engine rotation speed Netgt. In this way, when causing the engine 14 to make a transition from a stopped state into an operating state by starting the engine 14, by performing an operation control of the first rotary machine MG1 and an output control of the engine 14, the hybrid control unit 94 increases the engine rotation speed Ne so that the engine rotation speed Ne reaches the target engine rotation speed Netgt after the transition into an operating state of the engine 14. The control to increase the engine rotation speed Ne to the target engine rotation speed Netgt after complete explosion of the engine 14 is also included in a series of controls associated with engine starting, so that in the present example, the control to cause the engine 14 to make a transition from a stopped state into an operating state by starting the engine 14, that is, the control from the initiation of starting of the engine 14 until the increase in engine rotation speed Ne to the target engine rotation speed Netgt is defined as a control at the time of engine starting.

As the target engine rotation speed Netgt, an engine rotation speed Ne that realizes the transmission gear ratio γt of the composite transmission 40 with respect to the output rotation speed No is set. When a simulated stepped shifting control of the composite transmission 40 is executed, a simulated gear position of the composite transmission 40 is determined according to the simulated gear position shifting map, so that the target engine rotation speed Netgt is easily set to be high to establish the simulated gear position. If the target engine rotation speed Netgt is high, the engine rotation speed Ne may rapidly increase, and engine sound suddenly increases and is easily sensed as engine noise. Although the engine noise is suppressed if the engine rotation speed Ne does not rapidly increase, the engine rotation speed Ne slowly increases, so that an actual increase in the engine power Pe is suppressed and responsiveness of drive force is decreased. Therefore, in the present example, when increasing the engine rotation speed Ne to a target engine rotation speed Netgt determined by a simulated stepped shifting control at the time of engine starting, engine noise easily becomes a problem, however, in a situation where even if responsiveness of drive force decreases, this decreased responsiveness is unlikely to become a problem, as compared with a time other than such a situation, an increase rate of the engine rotation speed Ne when increasing the engine rotation speed Ne to the target engine rotation speed Netgt is suppressed. An increase rate of the engine rotation speed Ne is a change rate dNe/dt of the engine rotation speed Ne (=engine rotation change rate) when increasing the engine rotation speed Ne, and is referred to as an engine rotation speed increase rate in the present example.

When increasing the engine rotation speed Ne to a target engine rotation speed Netgt determined by a simulated stepped shifting control at the time of engine starting, engine noise easily becomes a problem at the time of engine starting in a vehicle state in a period from vehicle stoppage to about a medium vehicle speed. On the other hand, if a driver's output request amount is small, the driver hardly senses a lack of acceleration, so that even if responsiveness of drive force decreases, this is unlikely to become a problem. From a different viewpoint, the time when a driver's output request amount is increased is the time when the driver requests an increase in drive force, and is the time when the driver has an intention of acceleration, and if the engine rotation speed increase rate is suppressed, requested engine power Pe is not generated, and responsiveness of drive force easily decreases. Therefore, it is appropriate that the engine rotation speed increase rate is suppressed when the vehicle speed V is equal to or lower than a predetermined vehicle speed, and a driver's output request amount is smaller than a predetermined output request amount. The predetermined vehicle speed is, for example, an upper limit vehicle speed determined in advance for determining a vehicle state in a period from vehicle stoppage to about a medium vehicle speed where engine noise easily becomes a problem at the time of engine starting. The predetermined output request amount is an upper limit output request amount determined in advance for determining whether the output request amount is small enough even if, for example, responsiveness of drive force decreases at the time of engine starting, the decreased responsiveness is unlikely to become a problem. When an accelerator opening θacc is used as an output request amount, the predetermined output request amount is a predetermined accelerator opening.

When starting the engine 14 and increasing the engine rotation speed Ne to a target engine rotation speed Netgt determined by a simulated stepped shifting control, that is, when increasing the engine rotation speed Ne as in stepped shifting at the time of engine starting, in a case where suppression conditions further including a condition that the vehicle speed V is equal to or lower than the predetermined vehicle speed and a condition that a driver's output request amount is smaller than the predetermined output request amount, is satisfied, the hybrid control unit 94 suppresses the engine rotation speed increase rate until a predetermined time elapses from an initiation of starting of the engine 14 as compared with a case where the suppression conditions are not satisfied. The predetermined time is, for example, a time determined in advance to be appropriate for suppressing the engine rotation speed increase rate to suppress engine noise at the time of engine starting. Therefore, a condition that it is within the predetermined time after the initiation of starting of the engine 14 is also one of the suppression conditions.

Other appropriate conditions that can be employed as suppression conditions are described. For example, when the engine 14 is controlled on the assumption that the engine rotation speed Ne at the time of starting increases at a predetermined engine rotation speed increase rate, if the engine rotation speed increase rate at the time of starting is suppressed, an air-fuel ratio (=A/F) deviates from stoichiometric and changes to the rich side and may influence the emission. Therefore, it is appropriate that the engine rotation speed increase rate is suppressed when the catalyst is in a warmed-up state. After the first starting of the engine 14, before warming-up of the catalyst is completed, the engine 14 is maintained in an operating state in principle, so that at the time of starting when the engine 14 is intermittently operated, that is, when it is not first starting of the engine 14, the catalyst is highly likely to be in a warmed-up state.

Therefore, it is appropriate that the engine rotation speed increase rate is suppressed at times other than the time of first starting of the engine 14. Therefore, the suppression conditions may further include a condition that the starting of the engine 14 is not a first starting after the electronic control device 90 is turned on. The time after the electronic control device 90 is turned on is, for example, the time after the ignition is turned on, or the time after a system relating to running of the vehicle 10 is turned on.

When the engine 14 is cold, that is, the engine coolant temperature THeng is low, a fuel injection amount is increased, so that if the engine rotation speed increase rate at the time of starting is suppressed, the air-fuel ratio more easily changes to the rich side and may influence the emission. Therefore, it is appropriate that the engine rotation speed increase rate is suppressed when the engine coolant temperature THeng is higher than a predetermined coolant temperature. Therefore, the suppression conditions may further include a condition that the engine coolant temperature THeng is higher than the predetermined coolant temperature. The predetermined coolant temperature is, for example, a lower limit engine coolant temperature determined in advance for determining an engine coolant temperature THeng that does not require an increase in fuel injection amount for warming-up of the engine 14.

Starting of the engine 14 requested during a transition of the engine 14 from an operating state into a stopped state is when an output of the engine 14, for example, the engine power Pe is urgently required even during a transition of the engine 14 into a stopped state, so that if the engine rotation speed increase rate is suppressed, necessary engine power Pe is not generated, and acceleration easily delays. Therefore, it is appropriate that the engine rotation speed increase rate is suppressed at times other than the time of starting of the engine 14 requested during a transition of the engine 14 from an operating state into a stopped state, that is, other than the time of starting of the engine 14 during engine stop processing. Therefore, the suppression conditions may further include a condition that it is not the start of the engine 14 during engine stop processing.

In a shifting control of the stepped transmission unit 20, when downshifting is advanced at an engagement timing of an engagement device CB according to a change in input torque or AT input rotation speed Ni into the stepped transmission unit 20, for example, when a hydraulic control in shifting of the stepped transmission unit 20 is performed by anticipating a change in the engine power Pe or AT input rotation speed Ni, if the engine rotation speed increase rate is suppressed, it may be difficult to match the engagement timing of the engagement device CB and a shock may occur. Therefore, it is appropriate that the engine rotation speed increase rate is suppressed except during downshifting of the stepped transmission unit 20, that is, except during AT downshifting. Therefore, the suppression conditions may further include a condition that AT downshifting is not being executed.

In detail, the electronic control device 90 further includes a condition satisfaction determination means, that is, a condition satisfaction determination unit 96 to realize a control function to suppress the engine rotation speed increase rate.

The condition satisfaction determination unit 96 determines whether the suppression conditions are satisfied based on whether all of the conditions that "it is within the predetermined time after the initiation of starting of the engine 14", "the starting of the engine 14 is not a first starting", "it is not starting of the engine 14 during engine stop processing", "the engine coolant temperature THeng is higher than the predetermined coolant temperature", "the vehicle speed V is equal to or lower than the predetermined vehicle speed", "the accelerator opening θacc is smaller than the predetermined accelerator opening", and "AT downshifting is not being executed" are satisfied.

When increasing the engine rotation speed Ne as in stepped shifting at the time of engine starting, in a case where the condition satisfaction determination unit 96 determines that the suppression conditions have not been satisfied, the hybrid control unit 94 sets a normal increase rate as the engine rotation speed increase rate, and does not suppress the engine rotation speed increase rate. The normal increase rate is, for example, an engine rotation speed increase rate determined in advance to be appropriate to be used at the time of engine starting, and is the predetermined engine rotation speed increase rate. Alternatively, the normal increase rate is, for example, a drivability decrease suppressing increase rate determined in advance to suppress a decrease in drivability due to a delay in generation of transient engine power Pe at the time of engine starting.

When increasing the engine rotation speed Ne as in stepped shifting at the time of engine starting, in a case where the condition satisfaction determination unit 96 determines that the suppression conditions have been satisfied, the hybrid control unit 94 suppresses the engine rotation speed increase rate by setting a noise suppressing increase rate as the engine rotation speed increase rate. The noise suppressing increase rate is, for example, an engine rotation speed increase rate smaller than the normal increase rate, and is an engine rotation speed increase rate determined in advance to be appropriate for suppressing engine noise at the time of engine starting.

When the engine rotation speed increase rate is suppressed, an increase in actual engine power Pe is suppressed. Therefore, a suppressed amount of the engine power Pe is made up for by an increase in MG2 power Pm being power of the second rotary machine MG2, that is, battery power Pbat. Accordingly, under the situation where engine noise becomes a problem, engine noise can be suppressed while a requested drive power Pdem is realized. The requested drive power Pdem mentioned here is synonymous with a necessary drive force.

Figure 7:
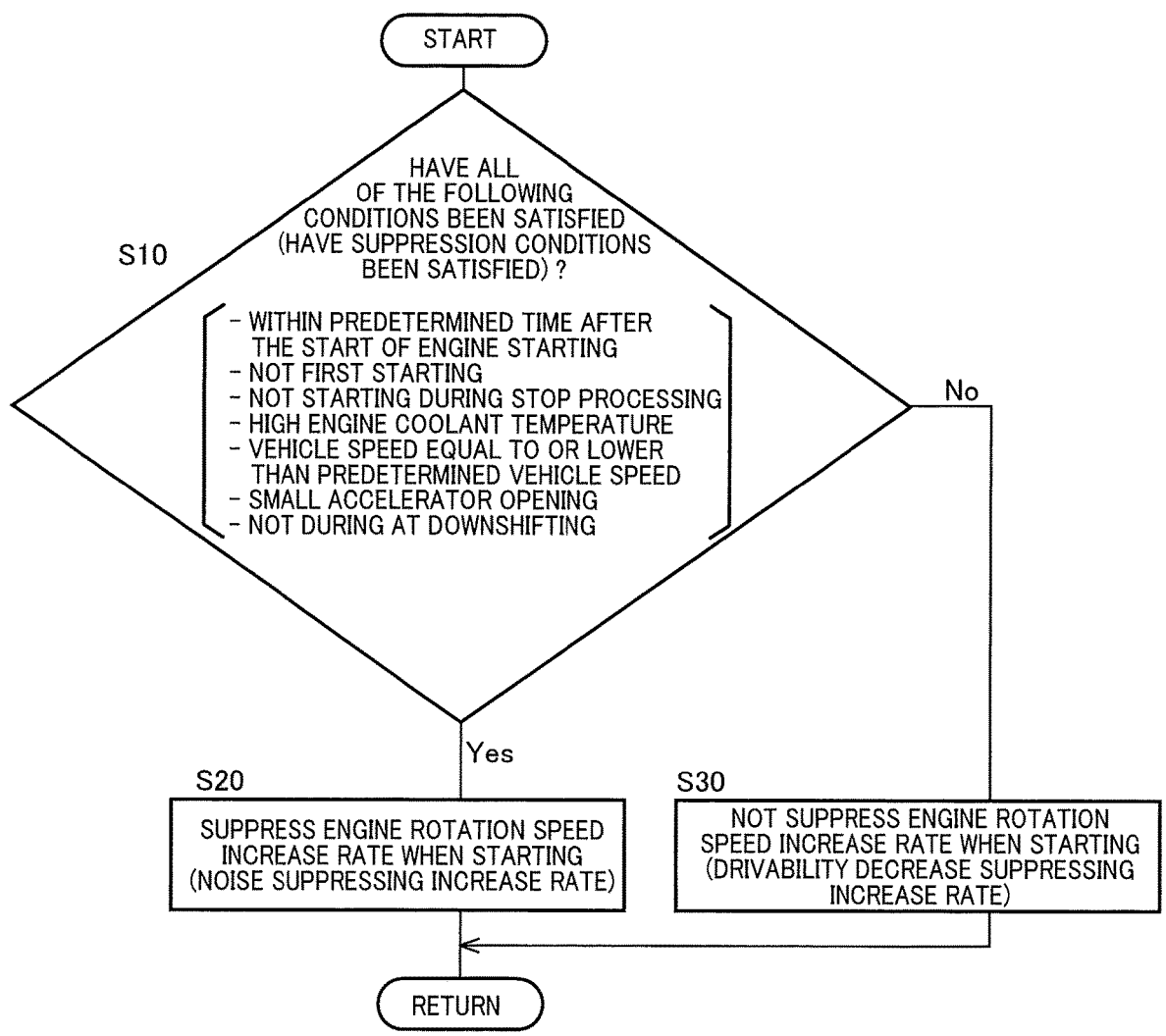
FIG. 7 is a flowchart describing an essential portion of a control operation of an electronic control device, that is, a control operation to suppress engine noise while reducing an influence on responsiveness of drive force when increasing an engine rotation speed as in stepped shifting at the time of engine starting.

FIG. 7 is a flowchart describing an essential portion of a control operation of the electronic control device 90, that is, a control operation to suppress engine noise while reducing an influence on responsiveness of drive force when increasing the engine rotation speed Ne as in stepped shifting at the time of engine starting, and the control operation is repeatedly performed at the time of engine starting when starting the engine 14 and increasing the engine rotation speed Ne to the target engine rotation speed Netgt determined by a simulated stepped shifting control.

In FIG. 7, first, in Step (hereinafter, Step is omitted) S10 corresponding to the function of the condition satisfaction determination unit 96, whether the suppression conditions have been satisfied is determined based on whether all of the conditions that "it is within the predetermined time after the initiation of starting of the engine 14", "the starting of the engine 14 is not a first starting", "it is not starting of the engine 14 during engine stop processing", "the engine coolant temperature THeng is higher than the predetermined coolant temperature", "the vehicle speed V is equal to or lower than the predetermined vehicle speed", "the accelerator opening θacc is smaller than the predetermined accelerator opening", and "AT downshifting is not being executed" are satisfied. When a result of this determination in S10 is affirmative, in S20 corresponding to the function of the hybrid control unit 94, at the time of engine starting, the engine rotation speed increase rate is suppressed by setting a noise suppressing increase rate as the engine rotation speed increase rate. On the other hand, when the result of determination in S10 is negative, in S30 corresponding to the function of the hybrid control unit 94, at the time of engine starting, a drivability decrease suppressing increase rate is set as the engine rotation speed increase rate, and the engine rotation speed increase rate is not suppressed.

As described above, according to the present example, when increasing the engine rotation speed Ne as in stepped shifting at the time of engine starting, in a case where the suppression conditions further including the condition that the vehicle speed V is equal to or lower than the predetermined vehicle speed, and the condition that a driver's output request amount is smaller than the predetermined output request amount, is satisfied, the engine rotation speed increase rate is suppressed until a predetermined time elapses from the initiation of starting of the engine 14, as compared with a case where the suppression conditions are not satisfied, so that engine noise at the time of engine starting in a vehicle state in a period from vehicle stoppage to about a medium vehicle speed in which engine noise easily becomes a problem is suppressed. At this time, the engine rotation speed increase rate is suppressed when a driver's output request amount is smaller than the predetermined output request amount, so that the driver hardly senses a lack of acceleration, and therefore, even if the engine power Pe is suppressed and responsiveness of drive force decreases, the decreased responsiveness is unlikely to become a problem. From a different viewpoint, the engine rotation speed increase rate is not suppressed when a driver's output request amount is equal to or more than the predetermined output request amount, so that when a driver has an intention of acceleration, responsiveness of drive force is likely to decrease. Therefore, when increasing the engine rotation speed Ne as in stepped shifting at the time of engine starting, engine noise can be suppressed while an influence on responsiveness of drive force is suppressed.

According to the present example, the engine rotation speed increase rate is suppressed at times other than the time of first starting of the engine 14, so that an influence on the emission is suppressed.

According to the present example, the engine rotation speed increase rate is suppressed at times other than the time of starting of the engine 14 during engine stop processing, so that an influence on responsiveness of drive force is suppressed.

According to the present example, the engine rotation speed increase rate is suppressed when the engine coolant temperature THeng is higher than the predetermined coolant temperature, so that an influence on the emission is suppressed.

According to the present example, the engine rotation speed increase rate is suppressed except during AT downshifting, so that an influence on the responsiveness of the drive force when the engagement timing of the engagement device CB does not match is suppressed, and a shock due to the timing of the engagement device CB not being matched is suppressed.

According to the present example, when the engine rotation speed increase rate is suppressed by suppressing the engine power Pe, a suppressed amount of the engine power Pe is made up for by the MG2 power Pm in order to obtain a necessary drive force, so that in a vehicle state where engine noise easily becomes a problem, engine noise can be suppressed while a necessary drive force is obtained.

The example of the present invention is described with reference to the drawings in detail above, and the present invention is also applied to other aspects.

For example, in the above-described example, the suppression conditions are at least suppression conditions that the vehicle speed V is equal to or lower than the predetermined vehicle speed, a driver's output request amount is smaller than the predetermined output request amount, and it is within the predetermined time after the initiation of starting of the engine 14. For example, conditions to be determined in S10 in the flowchart of FIG. 7 include at least the respective conditions that "it is within the predetermined time after the initiation of starting of the engine 14", "the vehicle speed V is equal to or lower than the predetermined vehicle speed", and "the accelerator opening θacc is smaller than the predetermined accelerator opening". The respective conditions that "the starting of the engine 14 is not a first starting", "it is not starting of the engine 14 during engine stop processing", "the engine coolant temperature THeng is higher than the predetermined coolant temperature", and "AT downshifting is not being executed" may be appropriately included in the suppression conditions as necessary. In addition, when all of the conditions are satisfied, the suppression conditions are satisfied, and the engine rotation speed increase rate is suppressed, however, the present invention is not limited to this aspect. For example, as the number of satisfied conditions increases, the engine rotation speed increase rate may be made smaller. Alternatively, as the vehicle speed V becomes lower, the engine rotation speed increase rate may be made smaller.

In the above-described example, the present invention is described by illustrating the composite transmission 40, however, it is not limited to this aspect. For example, when the continuously variable transmission unit 18 is made to perform shifting like a stepped transmission, the target engine rotation speed Netgt is easily set to be high even with the continuously variable transmission unit 18 alone. Therefore, the present invention can also be applied to a vehicle that does not include the stepped transmission unit 20 but includes the continuously variable transmission unit 18 alone as a transmission. Alternatively, the present invention can also be applied to a parallel type hybrid vehicle including an engine and a rotary machine coupled to drive wheels in a power transmittable manner, and including an automatic transmission constituting a part of a power transmission path between the engine and drive wheels and capable of performing stepped shifting. Alternatively, the present invention can also be applied to a series type hybrid vehicle including an engine, a power generating rotary machine to be made to generate electric power by power of the engine, and a driving rotary machine to be driven by electric power generated by the rotary machine and/or electric power of a battery. In such a series type hybrid vehicle, for example, the engine rotation speed Ne requested when generating electric power by the power generating rotary machine so as to cover the electric power shortage that cannot be covered by electric power of the battery alone, is set as a target engine rotation speed Netgt. The necessary point is, the present invention can be applied to a hybrid vehicle as long as it includes an engine, a rotary machine capable of controlling a rotation speed of the engine, and a control device capable of performing a shifting control to change the rotation speed of the engine as in stepped shifting.

In the example described above, the vehicle 10 includes the continuously variable transmission unit 18 that includes a differential mechanism 32 being a single pinion type planetary gear drive and functions as an electric shifting mechanism, however, the vehicle is not limited to this aspect. For example, the continuously variable transmission unit 18 may be a shifting mechanism whose differential operation can be limited by control of a clutch or brake coupled to a rotational element of the differential mechanism 32. In addition, the differential mechanism 32 may be a double pinion type planetary gear drive. The differential mechanism 32 may be a differential mechanism including four or more rotational elements by coupling a plurality of planetary gear drives to each other. The differential mechanism 32 may be a differential gear device including a pinion to be driven to rotate by the engine 14 and a pair of bevel gears which mesh with the pinion and to which the first rotary machine MG1 and the intermediate transmission member 30 are respectively coupled. The differential mechanism 32 may be a mechanism in which, in a configuration including two or more planetary gear drives coupled to each other by rotational elements constituting parts of the planetary gear drives, and an engine, rotary machines, and drive wheels are respectively coupled to the rotational elements of the planetary gear drives in a power transmittable manner.

In the example described above, as a transmission constituting a part of the power transmission path between the intermediate transmission member 30 and the drive wheels 28, the stepped transmission unit 20 being a planetary gear type automatic transmission is illustrated, however, the configuration is not limited to this aspect. For example, this transmission may be an automatic transmission such as a synchromesh type parallel biaxial automatic transmission, a publicly-known DCT (Dual Clutch Transmission) that is a synchromesh type parallel biaxial automatic transmission and includes two systems of input shafts, or a publicly-known mechanical continuously variable transmission enabling stepless shifting such as a belt type continuously variable transmission. In the case where this transmission is a continuously variable transmission, a transmission gear ratio of the transmission when performing shifting like a stepped transmission as a whole of the composite transmission 40 is a transmission gear ratio of a gear position formed in a simulative manner like a simulated gear position. Alternatively, when this transmission is the DCT, any of a plurality of gear positions is formed by engagement of engagement devices linked to the respective input shafts of the two systems as any of the plurality of engagement devices.

In the example described above, an embodiment in which 10 kinds of simulated gear positions are assigned to four kinds of AT gear positions is illustrated, however, the present invention is not limited to this embodiment. Preferably, the number of simulated gear positions is only required to be equal to or larger than the number of AT gear positions, and may be equal to the number of AT gear positions, but desirably larger than the number of AT gear positions, and properly, for example, twice or more. Shifting of the AT gear position is performed so that rotation speeds of the intermediate transmission member 30 and the second rotary machine MG2 coupled to the intermediate transmission member 30 are maintained in a predetermined rotation speed range, and shifting of the simulated gear position is performed so that the engine rotation speed Ne is maintained in a predetermined rotation speed range, and the numbers of these gear positions are properly determined.

What has been described above is only an embodiment, and the present invention can be practiced based on the knowledge of a person skilled in the art in various aspects to which various modifications or improvements are added.

REFERENCE SIGNS LIST

10: hybrid vehicle
14: engine
20: mechanical stepped transmission unit (stepped automatic transmission)
28: drive wheels
30: intermediate transmission member (transmission member)
32: differential mechanism
90: electronic control device (control device)
CB: engagement device
MG1: first rotary machine (rotary machine)
MG2: second rotary machine

The invention claimed is:

1. A hybrid vehicle comprising an engine, a rotary machine configured to control a rotation speed of the engine, and a control device configured to perform a shifting control to change the rotation speed of the engine as in stepped shifting, wherein
when the engine is started and caused to make a transition from a stopped state into an operating state, the control device performs an operation control of the rotary machine and an output control of the engine to increase the rotation speed of the engine so that the rotation speed of the engine reaches a target engine rotation speed after the transition of the engine into the operating state, determined by the shifting control, and during increasing the rotation speed of the engine, when suppression conditions further including a condition that a vehicle speed is equal to or lower than a predetermined vehicle speed, and a condition that an output request amount by a driver is smaller than a predetermined output request amount, are satisfied, the control device suppresses an increase rate of the rotation speed of the engine until a predetermined time elapses from an initiation of starting of the engine as compared with when the suppression conditions are not satisfied.

2. The hybrid vehicle according to claim 1, wherein the suppression conditions further include a condition that the starting of the engine is not a first starting after the control device is turned on.

3. The hybrid vehicle according to claim 1, wherein the suppression conditions further include a condition that the starting of the engine is not requested during a transition of the engine from an operating state into a stopped state.

4. The hybrid vehicle according to claim 1, wherein the suppression conditions further include a condition that a temperature of a coolant of the engine is higher than a predetermined coolant temperature.

5. The hybrid vehicle according to claim 1, further comprising:
a stepped automatic transmission which constitutes a part of a power transmission path between the engine and a drive wheel, and in which each of a plurality of gear positions is formed by engagement of a respective set of a plurality of engagement devices, wherein
the suppression conditions further include a condition that downshifting of the automatic transmission is not being executed.

6. The hybrid vehicle according to claim 1, further comprising:
- a differential mechanism that distributes power of the engine to the rotary machine and a transmission member to transmit power to a drive wheel, and a second rotary machine coupled to the transmission member, wherein
- in a case where the suppression conditions are satisfied, the control device suppresses the increase rate of the rotation speed of the engine by suppressing an output of the engine, as compared to a case where the suppression conditions are not satisfied, and makes up for a suppressed amount of the output of the engine by an output of the second rotary machine in order to obtain a necessary drive force.

7. The hybrid vehicle according to claim 6, further comprising:
- a stepped automatic transmission which constitutes a part of a power transmission path between the transmission member and the drive wheel, and in which each of a plurality of gear positions is formed by engagement of a respective set of a plurality of engagement devices, wherein
- the suppression conditions further include a condition that downshifting of the automatic transmission is not being executed.

* * * * *